United States Patent
Kim et al.

(10) Patent No.: US 10,694,447 B2
(45) Date of Patent: Jun. 23, 2020

(54) METHOD FOR ATTEMPTING NETWORK ACCESS FROM NB-IOT RAT

(71) Applicant: LG ELECTRONICS INC., Seoul (KR)

(72) Inventors: Jaehyun Kim, Seoul (KR); Youngdae Lee, Seoul (KR); Taehun Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/088,561

(22) PCT Filed: Nov. 9, 2016

(86) PCT No.: PCT/KR2016/012837
§ 371 (c)(1),
(2) Date: Sep. 26, 2018

(87) PCT Pub. No.: WO2017/171184
PCT Pub. Date: Oct. 5, 2017

(65) Prior Publication Data
US 2019/0141609 A1    May 9, 2019

Related U.S. Application Data

(60) Provisional application No. 62/313,820, filed on Mar. 28, 2016, provisional application No. 62/315,656,
(Continued)

(51) Int. Cl.
*H04W 48/08* (2009.01)
*H04W 48/12* (2009.01)
(Continued)

(52) U.S. Cl.
CPC ............. *H04W 48/08* (2013.01); *H04L 67/10* (2013.01); *H04W 4/70* (2018.02); *H04W 48/02* (2013.01); *H04W 48/12* (2013.01); *H04W 76/10* (2018.02)

(58) Field of Classification Search
None
See application file for complete search history.

(56) References Cited

U.S. PATENT DOCUMENTS

| | | |
|---|---|---|
| 2014/0029530 A1 | 1/2014 | Kim et al. |
| 2015/0140998 A1 | 5/2015 | Kim et al. |

(Continued)

FOREIGN PATENT DOCUMENTS

WO    2015016546    2/2015

OTHER PUBLICATIONS

PCT International Application No. PCT/KR2016/012837, International Search Report dated Feb. 28, 2017, 4 pages.
(Continued)

*Primary Examiner* — Diane L Lo
(74) *Attorney, Agent, or Firm* — Lee, Hong, Degerman, Kang & Waimey PC

(57) ABSTRACT

Provided in one disclosure of the present specification is a method for a wireless device attempting network access. The method may comprise the steps of: an RRC layer of the wireless device receiving, from a cell, a first piece of information relating to an NB-IoT RAT; and an NAS layer in the wireless device determining whether to initiate an NAS signaling process even when a backoff timer is running, wherein the backoff timer may be running due to previously having received a rejection message, and wherein when the wireless device uses an NB-IoT RAT and when the NAS signaling process is for transmitting exception data, it may be determined to initiate the NAS signaling process
(Continued)

even though the backoff timer is running. The method may further comprise a step of the NAS layer in the wireless device setting an RRC establishment cause of an RRC connection request message as mobile originating (MO) exception data.

15 Claims, 16 Drawing Sheets

Related U.S. Application Data filed on Mar. 30, 2016, provisional application No. 62/318,236, filed on Apr. 5, 2016, provisional application No. 62/332,481, filed on May 6, 2016, provisional application No. 62/359,220, filed on Jul. 7, 2016, provisional application No. 62/359,664, filed on Jul. 7, 2016, provisional application No. 62/359,713, filed on Jul. 8, 2016, provisional application No. 62/379,755, filed on Aug. 26, 2016.

(51) Int. Cl.
*H04W 4/70* (2018.01)
*H04W 48/02* (2009.01)
*H04W 76/10* (2018.01)
*H04L 29/08* (2006.01)

(56) References Cited

U.S. PATENT DOCUMENTS

| | | | |
|---|---|---|---|
| 2016/0135143 A1* | 5/2016 | Won | H04W 72/005 370/312 |
| 2018/0220363 A1* | 8/2018 | Hoglund | H04W 48/02 |
| 2018/0376531 A1* | 12/2018 | Martinez Tarradell | H04W 76/27 |
| 2019/0014530 A1* | 1/2019 | Aghili | H04W 28/12 |
| 2019/0182764 A1* | 6/2019 | Nader | H04W 52/0206 |

OTHER PUBLICATIONS

LG Electronics Inc., "RRC Connection Control in NB-IOT", R2-154878, 3GPP TSG-RAN WG2 #91bis, Oct. 2015, 3 pages.
ASUSTeK, "Random Access procedure for Narrowband IOT", R2-154540, 3GPP TSG-RAN WG2 Meeting #91bis, Oct. 2015, 3 pages.

* cited by examiner

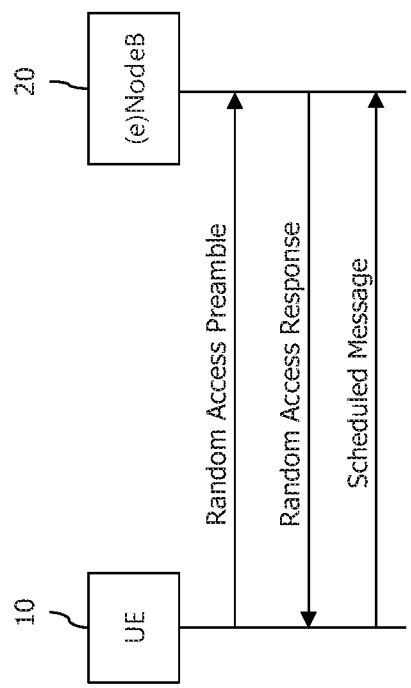

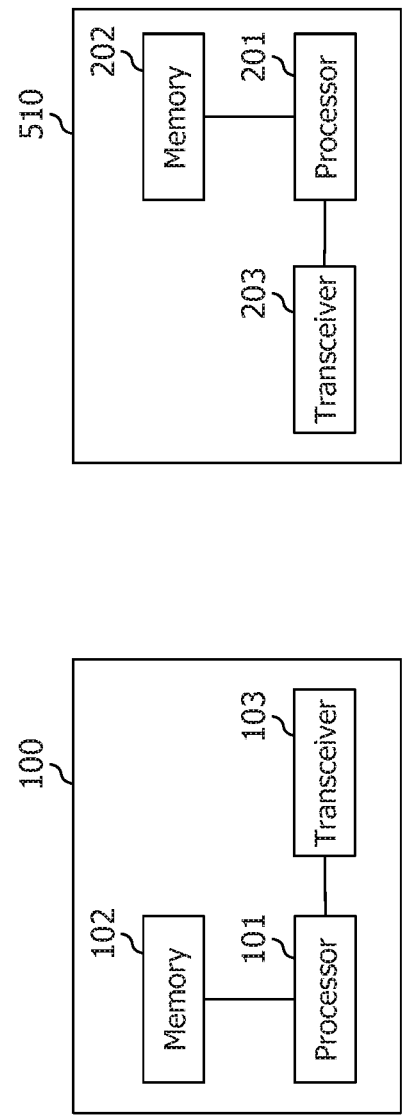

METHOD FOR ATTEMPTING NETWORK ACCESS FROM NB-IOT RAT

CROSS-REFERENCE TO RELATED APPLICATIONS

This application is the National Stage filing under 35 U.S.C. 371 of International Application No. PCT/KR2016/012837, filed on Nov. 9, 2016, which claims the benefit of U.S. Provisional Applications No. 62/313,820, filed on Mar. 28, 2016, 62/315,656, filed on Mar. 30, 2016, 62/318,236, filed on Apr. 5, 2016, 62/332,481, filed on May 6, 2016, 62/359,220, filed on Jul. 7, 2016, 62/359,664, filed on Jul. 7, 2016, 62/359,713, filed on Jul. 8, 2016 and 62/379,755, filed on Aug. 26, 2016, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGI | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, in order to solve a network overload problem, an eNodeB may broadcast information related to access class barring (ACB). Through the ACB, the UE may check whether an RRC connection request of its own is a barring target based on the ACB, and when the RRC connection request of the UE is not a barring target, the UE may transmit the RRC connection request.

However, network congestion may be aggravated due to an introduction of a machine type communication (MTC) device. In order to solve this, the eNodeB may broadcast extended assess barring (EAB)-related information. The MTC device may check whether an RRC connection request of its own is a barring target based on EAB, and only when the RRC connection request is not a barring target, the MTC device may transmit the RRC connection request.

The MTC communication is also called Internet of Things (IoT) communication since there is no intervention of a person. The IoT communication performed based on cellular, not Wireless LAN like Wi-Fi, is called CIoT. The CIoT supports a communication not based on IP as well as a communication based on IP, which is different from Wireless LAN.

Meanwhile, in order to support CIoT service, in 3GPP, a physical layer, that is, Radio Access Technology (RAT) has been improved. The improved RAT is called Narrowband-IoT (NB-IoT).

However, in the NB-IoT, which is improved RAT for the CIoT, an access control like ACB is not defined. Accordingly, it is unclear how to solve network overload and a network congested situation. Furthermore, when a network trial is barred in the network congested situation, a problem occurs that exceptional data to be urgently transmitted is also unable to be transmitted.

SUMMARY OF THE INVENTION

Accordingly, an object of the present invention is to present a method that can solve the aforementioned problem.

In order to achieve the above-described technical object, a disclosure of this specification provides a method for trying a network access. The method may be performed by a wireless device and comprise: receiving, by a radio resource control (RRC) layer of the wireless device and from a cell, first information related to a narrowband internet of things (NB-IoT) radio access technology (RAT); determining, by a non-access stratum (NAS) layer of the wireless device, whether to initiate a NAS signaling procedure while a back-off timer is running. The back-off timer has been started in response to a previous reception of a reject message. Although the back-off timer is running, the NAS signaling procedure may be determined to be initiated when the NAS signaling procedure is to transmit an exceptional data and when the wireless device uses the NB-IoT RAT. The method may comprise: setting, by the NAS layer, a RRC establishment cause of RRC connection request message to the MO exceptional data when the NAS signaling procedure is to transmit the exceptional data.

The first information related to the NB-IoT RAT may be received via a master information block (MIB) or first information block (SIB).

The method may comprise: receiving, by the RRC layer and from the cell, second information indicating whether an access barring is applied or not for the exceptional data.

The second information may be received via a system information block (SIB).

The method may further comprise: performing, by the RRC layer, an access barring check. If the RRC establishment cause is set to the MO exceptional data and if the second information indicates that the access barring is not applied thereby being skipped for the exceptional data, the access barring check results in that a network access for transmitting the exceptional data is not barred.

The MIB may further include: third information indicating whether the access barring is enabled or not.

The SIB may further include: a bitmap indicating whether the access baring is on or off.

In order to achieve the above-described technical object, a disclosure of this specification provides a method for trying a network access. The method may performed by a wireless device and comprise: receiving, by a radio resource control (RRC) layer of the wireless device and from a cell, first information related to a narrowband internet of things (NB-IoT) radio access technology (RAT); determining, by a non-access stratum (NAS) layer of the wireless device, whether to initiate a NAS signaling procedure while an access to a cell is currently barred. Although the cell is currently barred, the NAS signaling procedure is determined to be initiated when the NAS signaling procedure is to transmit an exceptional data and when the wireless device uses the NB-IoT RAT. The method may comprise: setting, by the NAS layer of the wireless device, a RRC establishment cause of RRC connection request message to the MO exceptional data.

In order to achieve the above-described technical object, a disclosure of this specification provides a wireless device for trying a network access. The wireless device may comprise: a transceiver; and a processor configured to control the transceiver and include a radio resource control (RRC) layer and a non-access stratum (NAS) layer. The processor may receive, via the RRC layer and from a cell, first information related to a narrowband internet of things (NB-IoT) radio access technology (RAT). The processor may control the NAS layer to determine whether to initiate a NAS signaling procedure while a back-off timer is running. The back-off timer has been started in response to a previous reception of a reject message. Although the back-off timer is running, the NAS signaling procedure is determined to be initiated when the NAS signaling procedure is to transmit an exceptional data and when the wireless device uses the NB-IoT RAT. The processor may control the NAS layer to set a RRC establishment cause of RRC connection request message to the MO exceptional data when the NAS signaling procedure is to transmit the exceptional data.

According to the present disclosure, the aforementioned problems of the related art may be solved.

BRIEF DESCRIPTION OF THE DRAWINGS

FIG. 5a is a flowchart illustrating a random access process in 3GPP LTE.

FIG. 14 is a block diagram illustrating a configuration of a wireless device 100 and a base station 200 according to an embodiment of the present invention.

DESCRIPTION OF EXEMPLARY EMBODIMENTS

Figure 1:
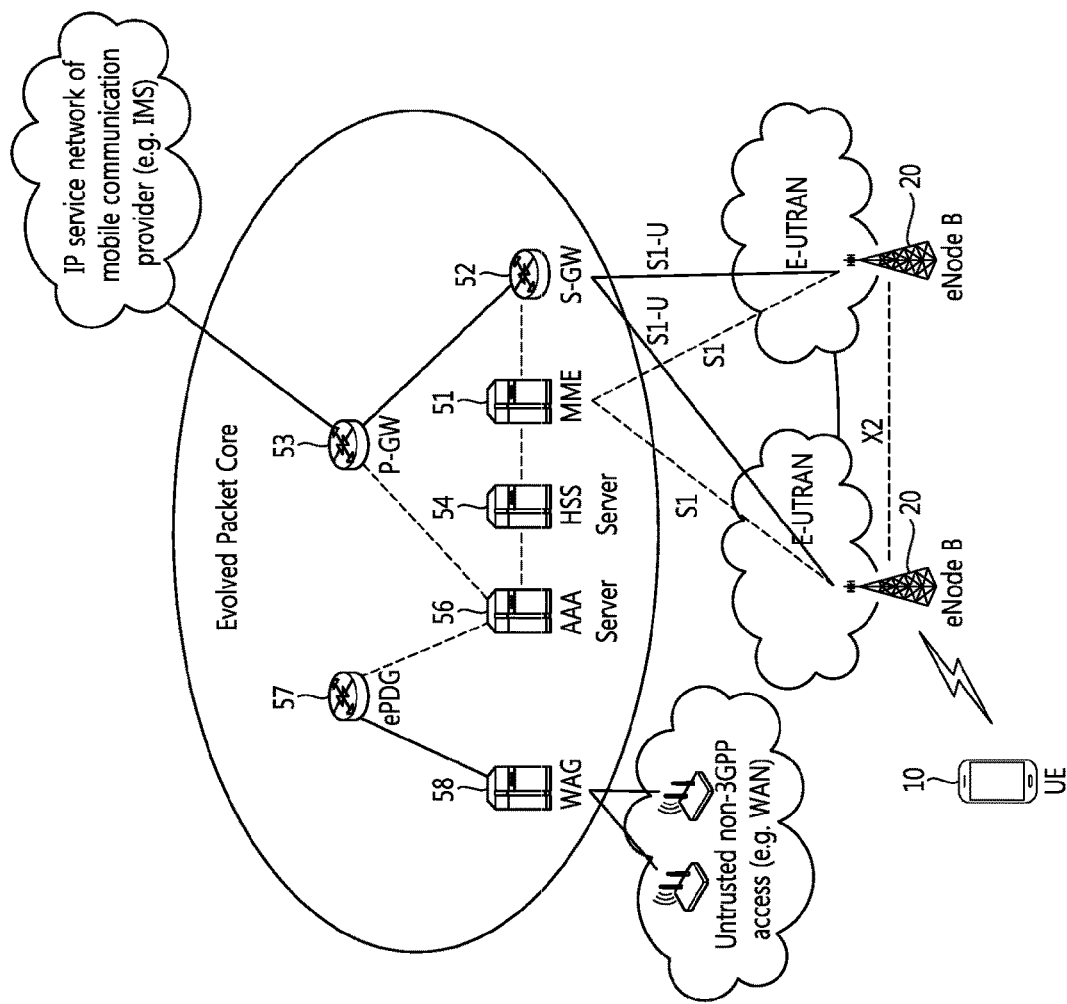
FIG. 1 is a structural diagram of an evolved mobile communication network.
Figure 2:
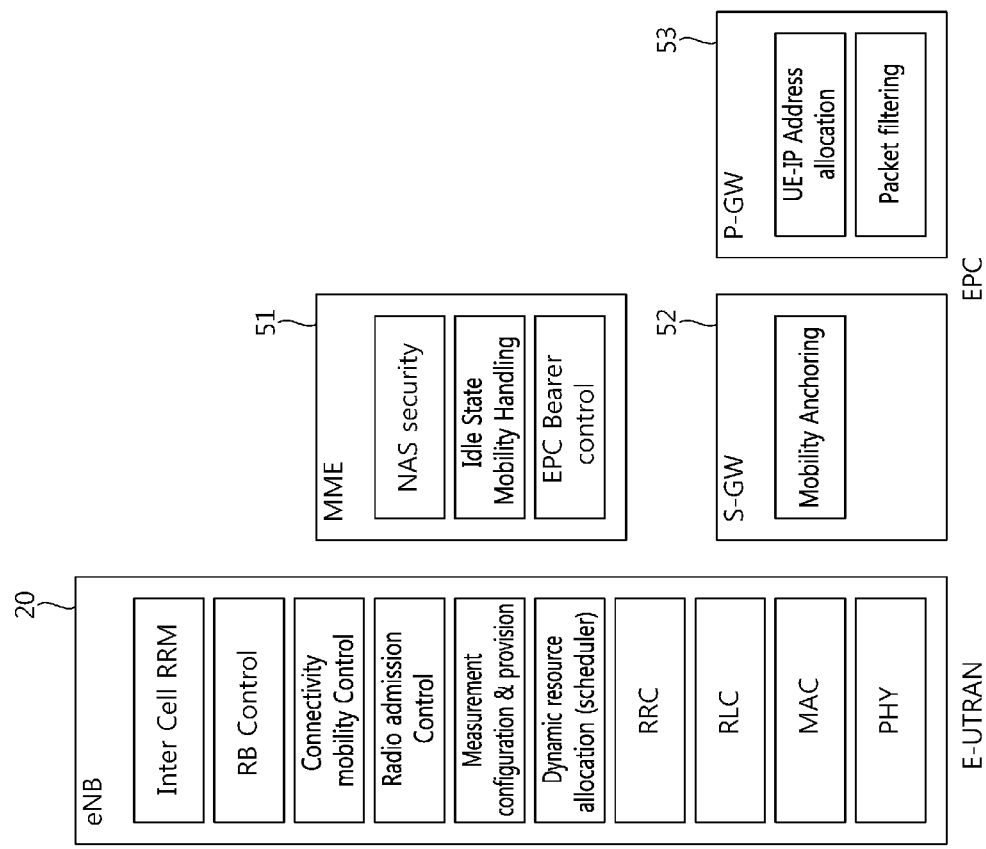
FIG. 2 is an exemplary diagram illustrating architectures of a general E-UTRAN and a general EPC.
Figure 3:
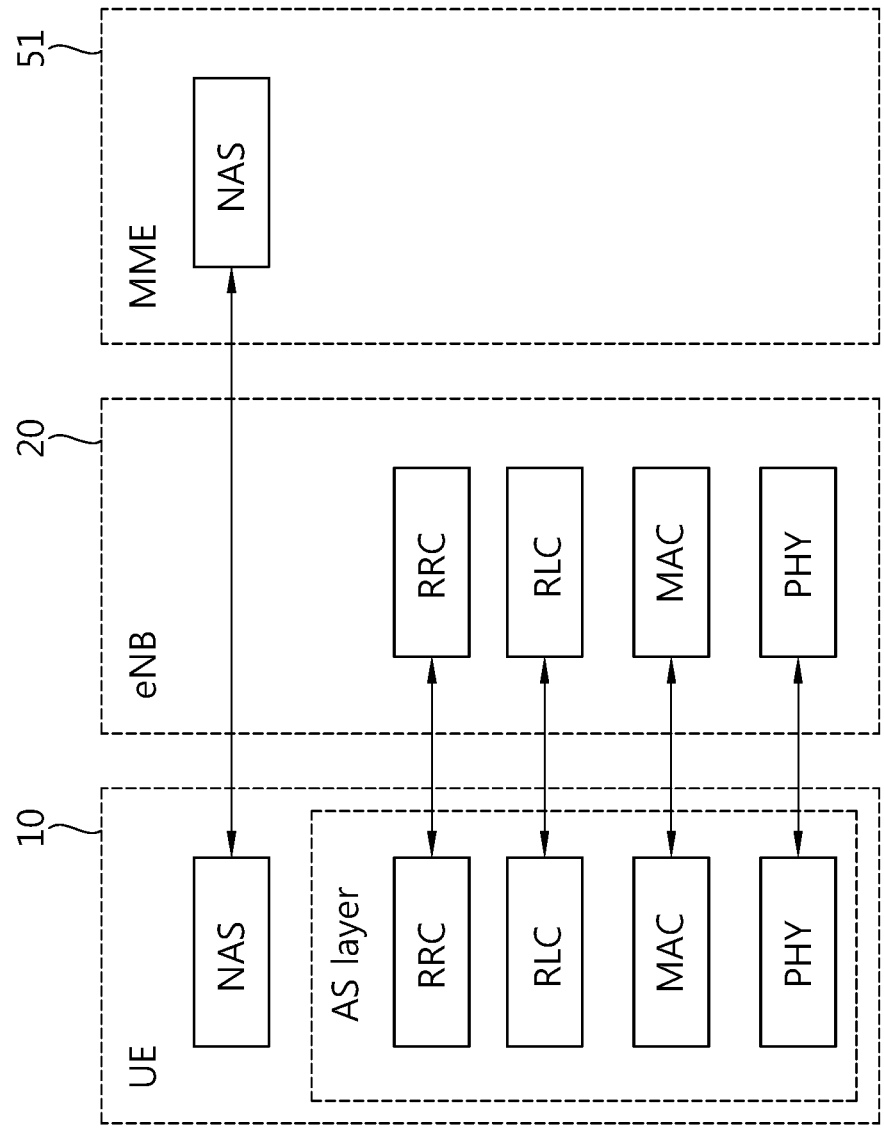
FIG. 3 is an exemplary diagram illustrating a structure of a radio interface protocol on a control plane between UE and eNodeB.
Figure 4:
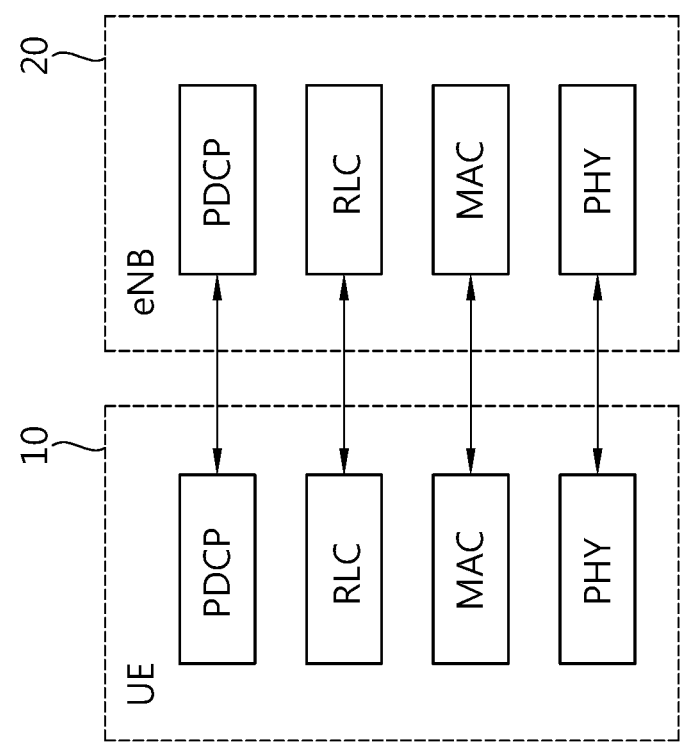
FIG. 4 is another exemplary diagram illustrating a structure of a radio interface protocol on a user plane between the UE and a base station.
Figure 5B:
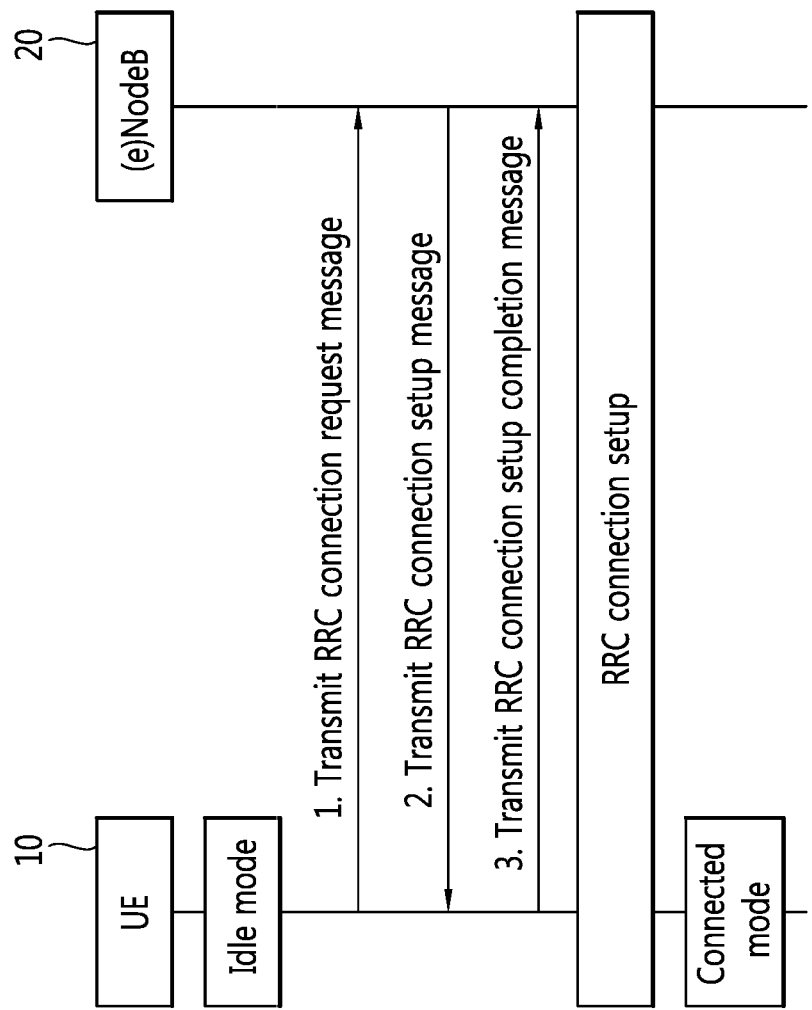
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

CIoT: An abbreviation of Cellular Internet of Things, and means performing based on IoT communication.

Control plane CIoT EPS optimization: A signaling optimization on a control plane that enables efficient transmission of user data (user data based on IP or non-IP or SMS)

User plane CIoT EPS optimization: A signaling optimization on a user plane that enables efficient transmission of user data (user data based on IP or non-IP or SMS)

UE supporting CIoT EPS optimization: A UE that supports Control plane CIoT EPS optimization or User plane CIoT EPS optimization and one or more other CIoT EPS optimizations NB-S1 mode: This means a mode operating as an improved RAT (radio access technology) for NB (Narrowband) IoT WB-S1 mode: This means a mode operating as a normal RAT, not an improved RAT for NB IoT Hereinafter, an aspect of the present specification is described with reference to the accompanying drawings.

Figure 6:
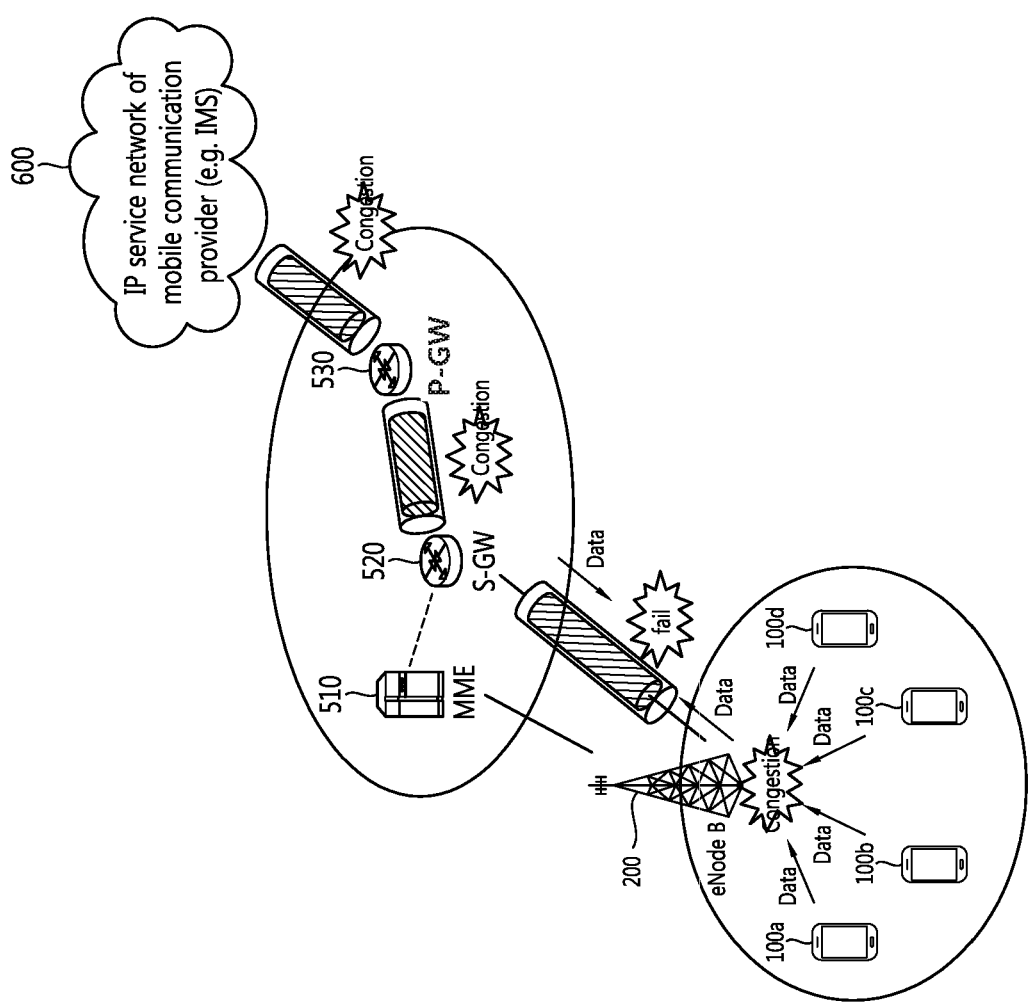
FIG. 6 illustrates a network overloaded state.

FIG. 6 shows a network overload state.

As shown in FIG. 6, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7:
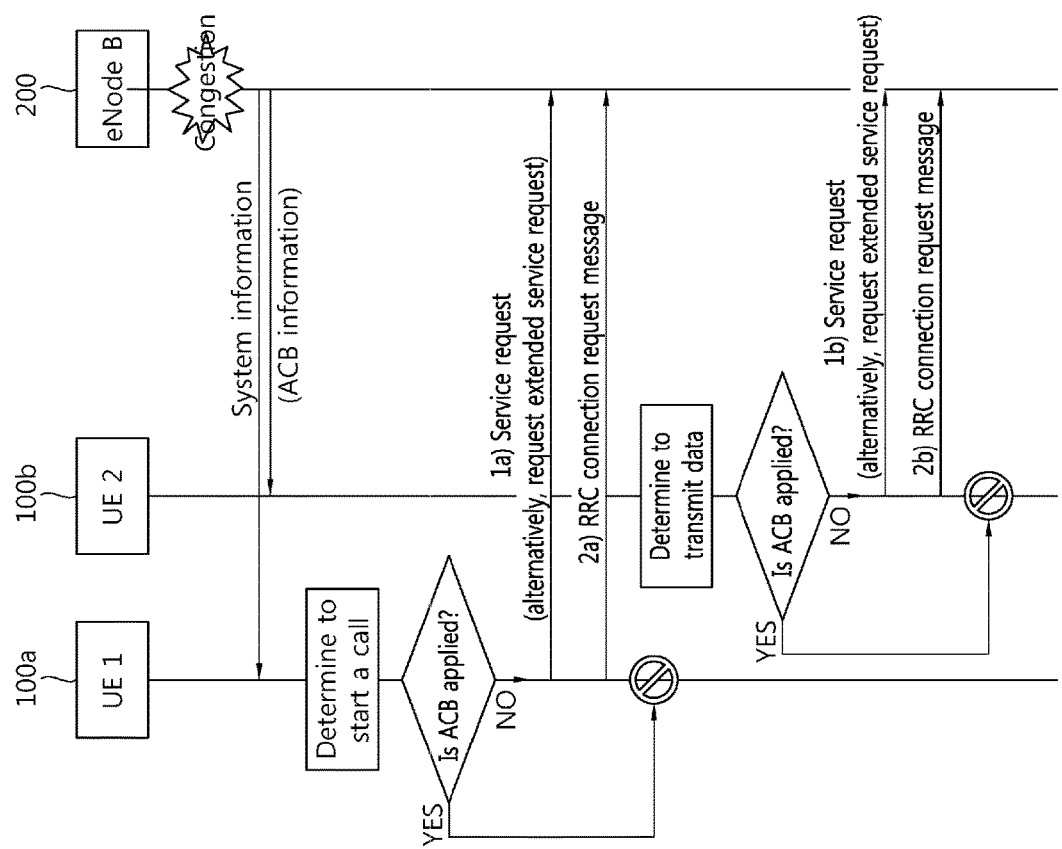
FIG. 7 is an exemplary flowchart illustrating an access barring operation in a network congested state.

FIG. 7 is an exemplary flowchart illustrating an access barring operation in a network congested state.

As illustrated in FIG. 7*a*, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

Meanwhile, the UE1 100*a* performs access barring check (that is, whether the ACB is applied). Similarly, the UE2 100*b* performs access barring check (that is, whether the ACB is applied).

If the ACB is not applied, the UE1 100*a* and the UE2 100*b* may transmit a service request (alternatively, an extended service request) message and the RRC connection request message, respectively. However, when the ACB is applied, both the UE1 100*a* and the UE2 100*b* may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100*a* and the UE2 100*b*. Then, the UE1 100*a* and the UE2 100*b* verify whether the access barring is applied, by using a barring factor included in the received ACB-related information, based on the stored access class. The access barring check is performed in each access stratum (AS) layer, that is, an RRC layer of the UE1 100*a* and the UE2 100*b*.

The access barring check will be described in more detail as follows.

The ac-BarringPerPLMN-List is included in the SIB type 2 received by each of the UE1 100*a* and the UE2 100*b*, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100*a* and the UE2 100*b* perform the RRC connection request, the access barring check is performed by using T303 as Tbarring and using ac-BarringForMO-Data as a barring parameter.

When the barring is determined, each AS(RRC) layer of the UE1 100*a* and the UE2 100*b* notifies a failure of the RRC connection establishment to the higher layer.

TABLE 2

| Field | Description |
| --- | --- |
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100*a* determines an IMS service, for example, mobile orienting of a call by VoLTE and generates a service request message. Similarly, UE2 100*b* determines mobile orienting of general data and generate the service request message.

Sequentially, the UE1 100*a* generates an RRC connection request message. Similarly, the UE2 100*b* generate the RRC connection request message.

Subsequently, as such, when the access is barred, each AS(RRC) layer determines whether a T302 timer or a Tbarring timer is driving. If the timer is not driving, the T302 timer or the Tbarring timer is driven.

Meanwhile, while the T302 timer or a Tbarring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, an access barring check is performed with respect to a normal Mobile Originating (MO) service, for example, an originating call, an originating data, an originating IMS voice and an originating IMS video. That is, ACB is applied accesses of all application programs (however, except a response to an urgent service or paging).

Figure 8:
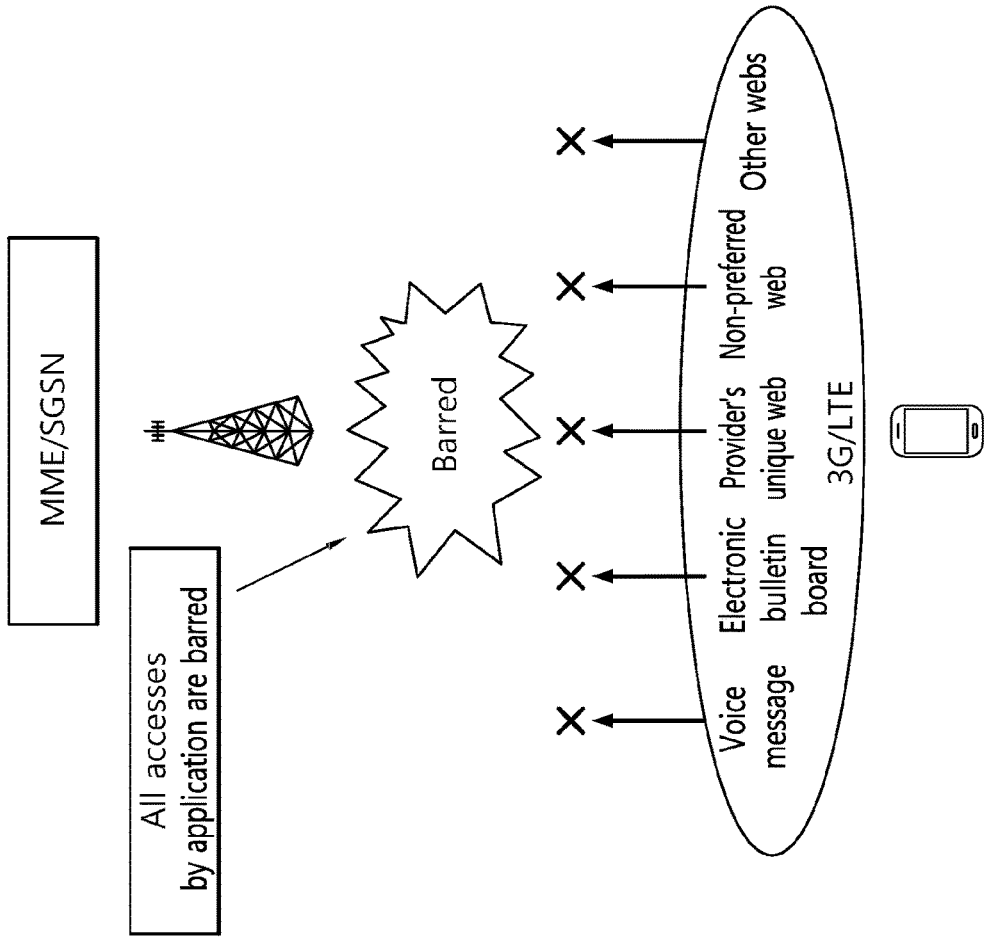
FIG. 8 illustrates an example that all accesses by all applications are barred when ACB is applied.

FIG. 8 illustrates an example that all accesses by all applications are barred when ACB is applied.

As can be seen with reference to FIG. 8, when it is determined to apply ACB once, accesses by all applications of UE (however, except a response to an urgent service or paging) are barred.

As such, accesses by all applications are barred, a differentiated service is unavailable. Such a problem causes network resource waste and degrades user experience, consequently.

Accordingly, in a situation of network overload and a congested situation, a method is required for differentiating Mobile Originating service (e.g., mobile originating voice call or mobile originating data) for each of specific application groups/categories. However, there has been no method for implementing it in the conventional art.

<Introduction of Application Specific Congestion Control Data Communication (ACDC)>

As a method for differentiating a normal Mobile Originating (MO) service, for example, an originating call, an originating data, an originating IMS voice and an originating IMS video, the Application specific Congestion control for Data Communication (ACDC) is proposed.

Figure 9:
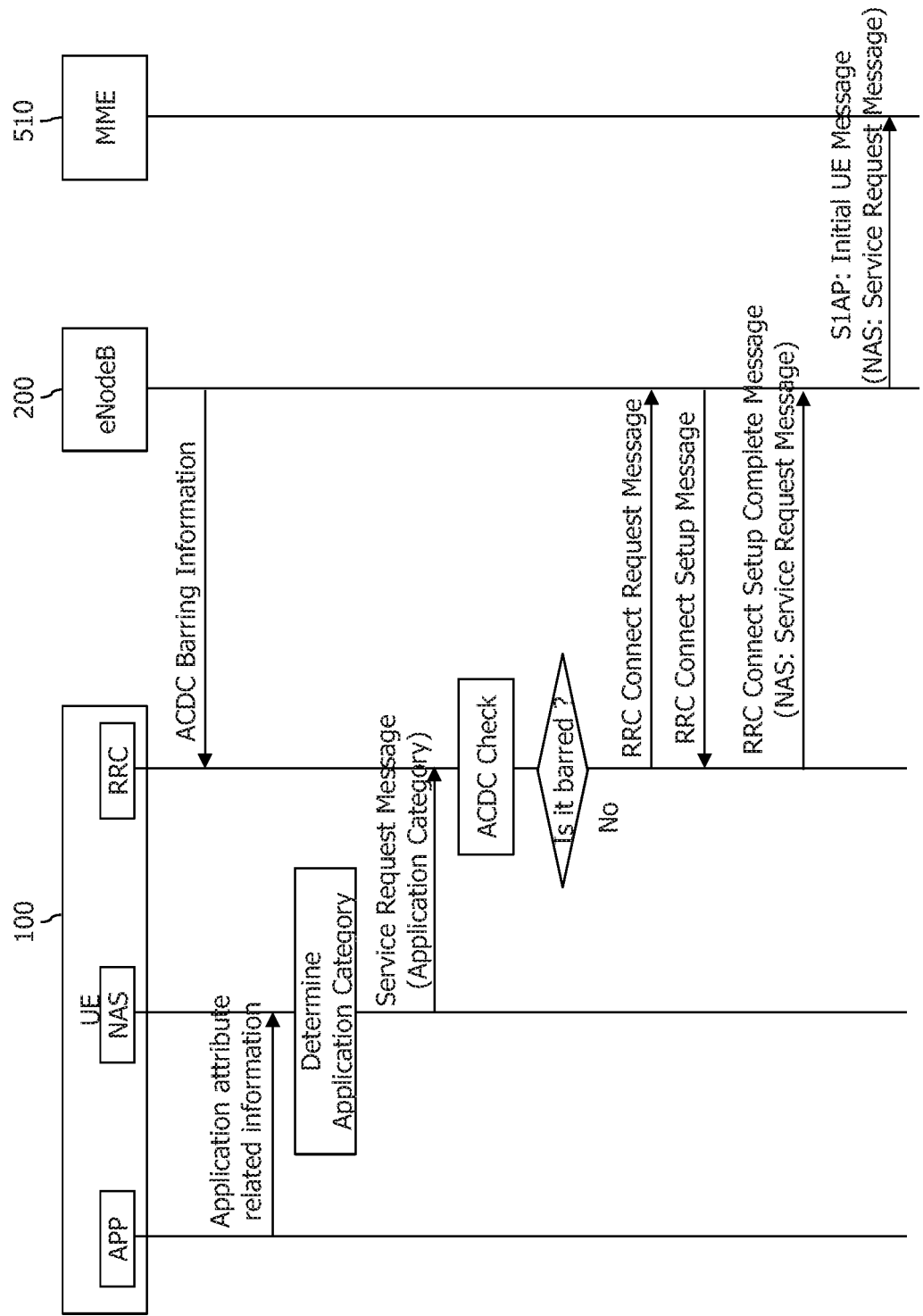
FIG. 9 is a signal flowchart illustrating a procedure according to the ACDC.

FIG. 9 is a signal flowchart illustrating a procedure according to the ACDC.

The procedure is described with reference to FIG. 9 as below.

First, a network (e.g., eNB) may provide ACDC barring information to a UE through SIB.

Meanwhile, in the case that a specific application is executed in the UE 100 and a data communication service is requested by the specific application, the application layer that manages the execution of the specific application provides application attribute related information to a NAS layer.

Then, the NAS layer of the UE 100 determines an application category for the ACDC based on the application attribute related information received from the application layer.

Subsequently, when the NAS layer of the UE 100 starts a service request procedure for service connection (a transmission of SERVICE REQUEST message or a transmission of EXTENDED SERVICE REQUEST message), the NAS layer of the UE 100 forwards the information for the application category to an AS layer (i.e., RRC layer).

Before the AS layer (i.e., RRC layer) of the UE 100 performs the service request procedure of the NAS layer (a transmission of SERVICE REQUEST message or a transmission of EXTENDED SERVICE REQUEST message), based on the category of the application and the ACDC barring information received from the network, the AS layer (i.e., RRC layer) of the UE 100 performs the ACDC barring check, and accordingly, determines whether to permit the service request procedure or not.

In the case that the service request procedure is permitted as a result of the ACDC barring check, the AS layer (i.e., RRC layer) of the UE 100 transmits an RRC Connect Request message to an eNodeB 200.

As described above, the service requested by the application which is executing in a UE may be differentiated and allowed or barred through the ACDC.

<Machine Type Communication (MTC) Communication>

The Machine Type Communication (MTC) means a communication established between a machine and a machine, in which a person is excluded, and the device used in this case is referred to an MTC device. The service provided through an MTC device is discriminated from the communication service in which a person intervenes, and may be applied to various ranges of services.

Figure 10A:
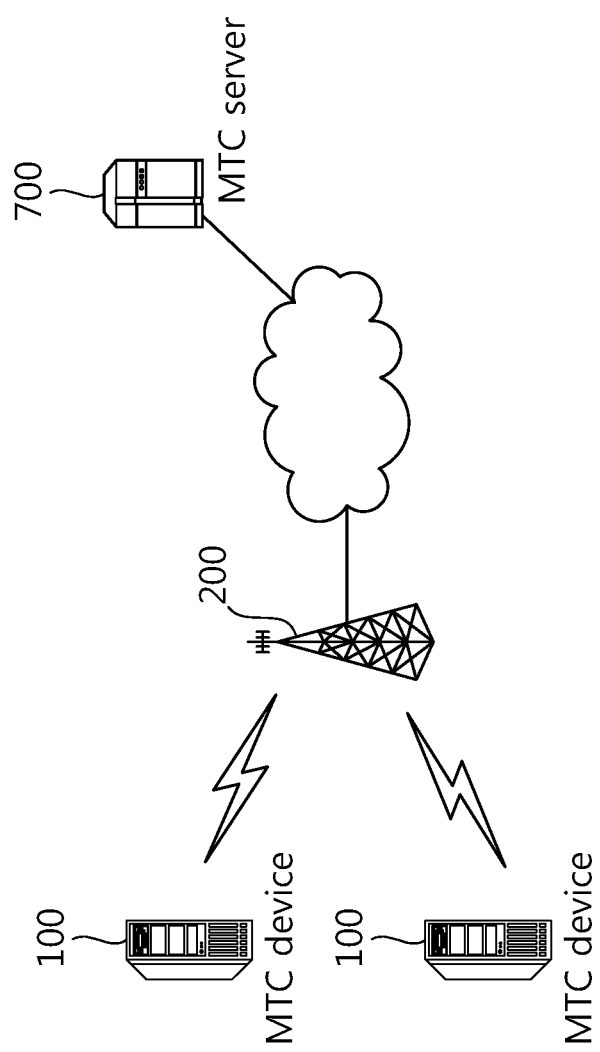
FIG. 10a illustrates an example of the Machine Type communication (MTC) communication.

FIG. 10a illustrates an example of the Machine Type communication (MTC) communication.

The Machine Type Communication (MTC) is referred to information interchange between MTC devices 100 through an eNodeB 200 in which human interaction is not accompanied or information interchange between an MTC device and an MTC server 700 through an eNodeB.

The MTC server 700 is an entity that communicates with an MTC device 100. The MTC server 700 executes an MTC application and provides a MTC-specific service to the MTC device.

The MTC device 100 is a wireless device that provides an MTC communication, and may be fixed or mobile.

Figure 10B:
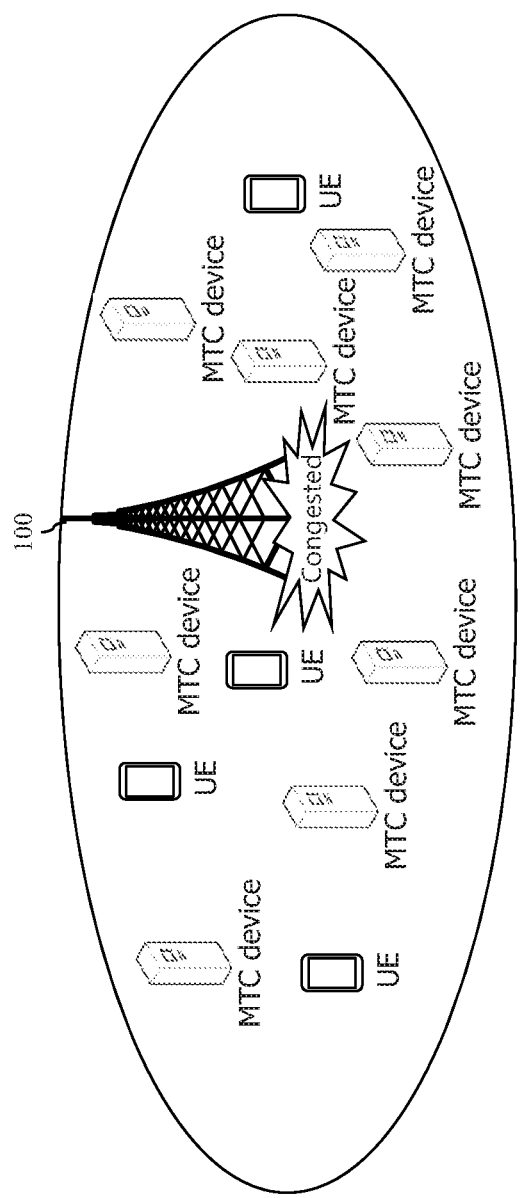
FIG. 10b illustrates an example in which network congestion is aggravated by MTC devices.

FIG. 10b illustrates an example in which network congestion is aggravated by MTC devices.

As can be seen from FIG. 10b, numerous MTC devices may be disposed within coverage of an eNodeB. Thus, network congestion may be further aggravated.

Figure 11:
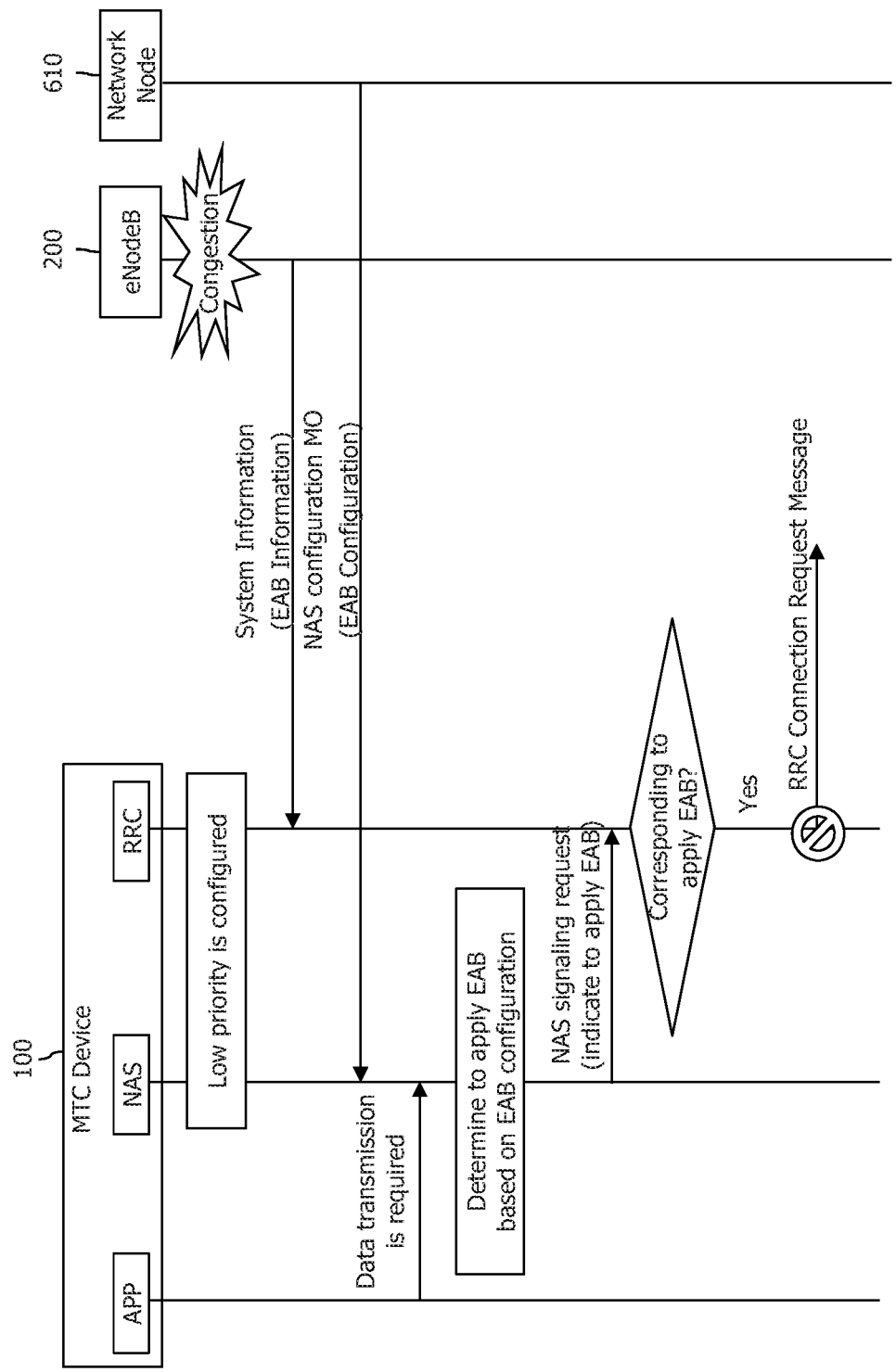
FIG. 11 illustrates an example of applying Extended Access Barring (EAB) to resolve congestion caused by MTC devices.

FIG. 11 illustrates an example of applying Extended Access Barring (EAB) to resolve congestion caused by MTC devices.

As shown in FIG. 11, an MTC device is configured to have low priority. In addition, in order to resolve congestion caused by the MTC device, the eNodeB broadcasts system information including EAB information. The system information including the EAB information may be system information block (SIB) type 14.

TABLE 3

| Description of SIB Type14 |
|---|
| eab-BarringBitmap |
| A bitmap for access classes (ACs) 0 to 9. The left most bit in the bitmap is for AC 0 and the nest bit is for AC 1. |
| eab-Category |
| This represents a category of UE to which EAB is applied. |
| eab-Common |
| This is an EAB parameter applied for all PLMNs. |
| eab-PerPLMN-List |
| This is an EAB parameter for each PLMN, enumerated in PLMN order. |

In addition, the eNodeB includes configuration information regarding whether a specific MTC device should apply EAB, that is, EAB configuration information, in a NAS configuration Management Object (MO) and transfers the same to the specific MTC device. When the low priority and EAB are set, a NAS layer of the MTC device informs an RRC layer about an indication regarding whether EAB is applied with respect to a corresponding NAS service request (e.g., Attach request procedure, TAU/RAU request procedure, Service Request procedure, Extended service request procedure, Data service request procedure, etc.), excluding a case corresponding to an emergency call, mobile terminated (MT) access, or a high priority access class (e.g., AC 11-15), and the RRC layer controls access by applying EAB when performing an RRC connection establishment procedure with respect to the corresponding request with the indication to apply EAB.

Accordingly, as illustrated, when an application layer APP of the MTC device 100 informs that a data transmission is required, the NAS layer determines to apply EAB based on EAB configuration. In addition, the application layer APP forwards a NAS service request to the RRC layer. At this time, indication to apply EAB is also delivered together with the NAS service request.

The RRC layer of the MTC device determines whether an RRC connection establishment request corresponds to EAB application. In the case that the EAB is applied, a transmission of the RRC connection establishment request message by the RRC layer is barred (or prohibited).

<Cellular Internet of Things (CIoT) Communication>

The MTC communication is also called Internet of Things (IoT) communication since there is no intervention of a person. The IoT communication performed based on cellular, not Wireless LAN like Wi-Fi, is called CIoT. The CIoT supports a communication not based on IP as well as a communication based on IP, which is different from Wireless LAN.

Meanwhile, in order to support CIoT service, in 3GPP, a physical layer, that is, Radio Access Technology (RAT) has been improved. The improved RAT is called Narrowband-IoT (NB-IoT).

The RAT improved for the NB-IoT uses an optimized physical layer (e.g., carrier bandwidth is 180 kHz, and subcarrier spacing is 3.75 kHz or 15 kHz) for very low power consumption. In the NB-IoT RAT, the various services which have been developed for the existing RAT may not be provided. Particularly, an urgent service using an emergency bearer, access class barring (ACB), EAB, ACDC, SSAC and the like are not be provided.

In such a CIoT service environment, many CIoT devices perform data transmissions, and in this case, network overload or congestion situation may occur. This case is solved by performing ACB previously, but in NB-IoT, which is improved RAT for CIoT, the access control like ACB is not provided. Thus, it is unclear how to settle the network overload or congestion situation.

Moreover, in a situation in which normal data transmission (e.g., normal state report) is barred owing to the access control in the CIoT service environment, it is required a processing method for the case that it is required to transmit urgent state report or exceptional report). That is, it is required to distinguish normal data transmission and urgent data transmission when CIoT devices perform data transmissions in the CIoT service environment.

<Disclosure of the Present Specification>

Accordingly, a disclosure of the present specification proposes proposals to solve the problem described above.

Particularly, the proposals according to a disclosure of the present specification proposes an efficient access control method for connecting a voice call (VoLTE) or a data communication for a Mobile Originating (MO) service (e.g., MO voice call, MO data or MO signal) of CIoT device (or UE) in a CIoT service support situation.

Meanwhile, in the CIoT service support situation, a network may forward an indicator indicating that CIoT service is supported to a CIoT device (or UE), for example, Indicator for CIoT using a Management Object according to a Device Management technique of Open Mobile Alliance (OMA). Otherwise, a network may forward an indicator indicating that CIoT service is supported, for example, NAS signalling CIoT indicator (or signalling NB-IoT indicator).

Only in the case that the CIoT device receives the indicator, the CIoT device may apply the Access control for the CIoT technique, which is proposed in the present specification. Otherwise, alternatively, even in the case that the CIoT device receives the existing NAS signalling low priority indicator through NAS configuration MO, or receives an indicator for exceptional data request, or does not receive any indicator, the access control for CIoT, which is proposed in the present specification.

Meanwhile, the network (e.g., eNB) may provide an indicator indicating that the access control for CIoT is applied (e.g., Access control for CIoT Indicator) to the CIoT device (or UE) in associated with or regardless of the indicator (i.e., Indicator for CIoT or NAS signalling CIoT indicator) or the new indicator for the exceptional data request (i.e., indicator for exceptional data request). The access control for CIoT proposed in the present specification may be applied to the CIoT device only in the case that the CIoT device receives the indicator (i.e., Access control for CIoT Indicator).

The network (e.g., eNB) may forward the information related to the access control for CIoT proposed in the present specification (e.g., Access control parameters for CIoT) to AS layer (i.e., RRC layer) of the CIoT device (or UE) through Master Information Block (MIB) or System Information Block (SIB). The related information (e.g., Access control parameters for CIoT) may be defined and included in SIB2, SIB14 or new SIB(xx). At this time, the related information that the network provides through MIB or SIB may include information for Barring time and Barring rate. In addition, the related information may include a bitmap indicating whether to bar (e.g., indicating on/off of Barring). Meanwhile, since the originating exception service may be an urgent service, in order to perform an RRC connection establishment or a connection resume quickly, for the originating exception service, the bitmap may indicate skip/pass of the barring check of an access control or indicate OFF. The relation information included in MIB or SIB may include information for the CIoT device to turn on/off skip/pass the barring check of the access control of CIoT (skip/pass=On/Off information/indication/flag, etc.). Accordingly, the originating exception service may be discriminated from a normal data service.

In the case of the originating exception service, different from other general mobile originating signaling or mobile originating voice call, when barring check is performed, RRC connection establishment or RRC connection reestablishment is guaranteed. At this time, the originating exception service is similar to an urgent service in the fact that it may transmit urgent data, but different from the urgent service in the fact that an emergency bearer is not setup. That is, the originating exception service enables fast NAS/RRC connection establishment or RRC connection reestablishment to be available, not configuring the urgent bearer.

The urgent service using the urgent bearer is used for providing IMS urgent session. The urgent service using the urgent bearer is provided to the UE that performs an urgent Attach. However, the urgent service using the urgent bearer may also be provided to the UE that performs a normal Attach according to a regulation of each nation. In order to use the urgent service using the urgent bearer, RRC establishment cause is setup as emergency. Meanwhile, in the case that a UE uses NB-IoT RAT, the urgent service using the urgent bearer is not supported. The application layer of the CIoT device may forward the information/indication distinguishing whether the data to transmit is normal data or exceptional data to a NAS layer.

Hereinafter, the proposals proposed in the present specification will be described one by one.

I. Proposal 1

In the case that a network support CIoT service, the network may forward the indication/information (e.g., NB-IoT support RAT) indicating that it is the RAT in which the CIoT service is supported to a UE through SIB or MIB information. The indication/information may be forwarded to a NAS layer after an AS layer (i.e., RRC layer) of the CIoT device receives it. In the case that the AS layer (i.e., RRC layer) of the CIoT device (or UE) receives the information, the AS layer may forward it to the NAS layer. The contents described below may be performed when the CIoT device receives the information or regardless of reception of the information.

I-1. Method 1 of Proposal 1

When the NAS layer starts the NAS signaling request procedure (e.g., Attach request procedure, TAU/RAU request procedure, service request procedure, extended service request procedure, data service request procedure, etc.) for data transmission, the NAS layer configures the voice call type and the RRC establishment cause field, and provides it to the AS layer (i.e., RRC layer). In addition, the NAS layer provides the indication/information indicating to apply the access control for the CIoT to the AS layer (i.e., RRC layer).

Here, since the service for MO exceptional service (or exceptional data or exceptional signaling) is urgent data basically, in order to guarantee the RRC connection establishment or RRC connection reestablishment, the NAS layer may provide the indication for passing/skipping the barring check of the access control for the CIoT (or RRC establishment cause field configured as MO exception) to the AS layer (i.e., RRC layer) separately from the indication/information indicating to apply the access control for the CIoT.

Based on the RRC establishment cause field and the indication/information indicating to apply the access control for the CIoT, the AS layer (i.e., RRC layer) performs the barring check for the access control according to the information related to the access control for CIoT (e.g., Access control parameters for CIoT) provided from the network through MIB or SIB. The access control may discriminate the NAS signaling request procedure based on probability. Otherwise, the access control may determine whether to bar the access based on bitmap.

At this time, since the originating exception service is for urgent data, the AS layer determines whether to skip/pass the barring check according to the request type provided from the NAS layer (e.g., MO exception calls or MO exception signalling), the RRC establishment cause field (e.g., MO exception) and the information of turning on/off the skip/pass the barring check for the access control of CIoT (skip/pass=On/Off information/indication/flag, etc.).

Here, in the case of the originating exception service, different from other general mobile originating signaling or mobile originating voice call, when barring check is performed, RRC connection establishment or RRC connection reestablishment is guaranteed. At this time, the originating exception service is similar to an urgent service in the fact that it may transmit urgent data, but different from the urgent service in the fact that an emergency bearer is not setup. That is, the originating exception service enables fast NAS/RRC connection establishment or RRC connection reestablishment to be available, not configuring the urgent bearer.

In the case that the access (e.g., access to a network or a cell) is barred as a result of the barring check of the access control, the AS layer forwards the indication/information indicating that the access is barred (access barred indication/information) to the NAS layer. At this time, the AS layer (i.e., RRC layer) may drive a Barring timer (Tbarring). Later, when the Barring timer (Tbarring) expires, the AS layer (i.e., RRC layer) informs by providing the indication/information informing the access barring alleviation to the NAS layer.

After the NAS layer is provided with the indication/information indicating that the access is barred (access barred indication/information) from the AS layer (i.e., RRC layer), the NAS layer does not perform any NAS signaling request procedure (e.g., Attach request procedure, TAU/RAU request procedure, service request procedure, extended service request procedure, data service request procedure, etc.) until the NAS layer is provided with the indication/information informing the access barring alleviation from the AS layer (i.e., RRC layer).

Hereinafter, with reference to accompanying drawing, Method 1 of Proposal 1 is described in summary.

Figure 12:
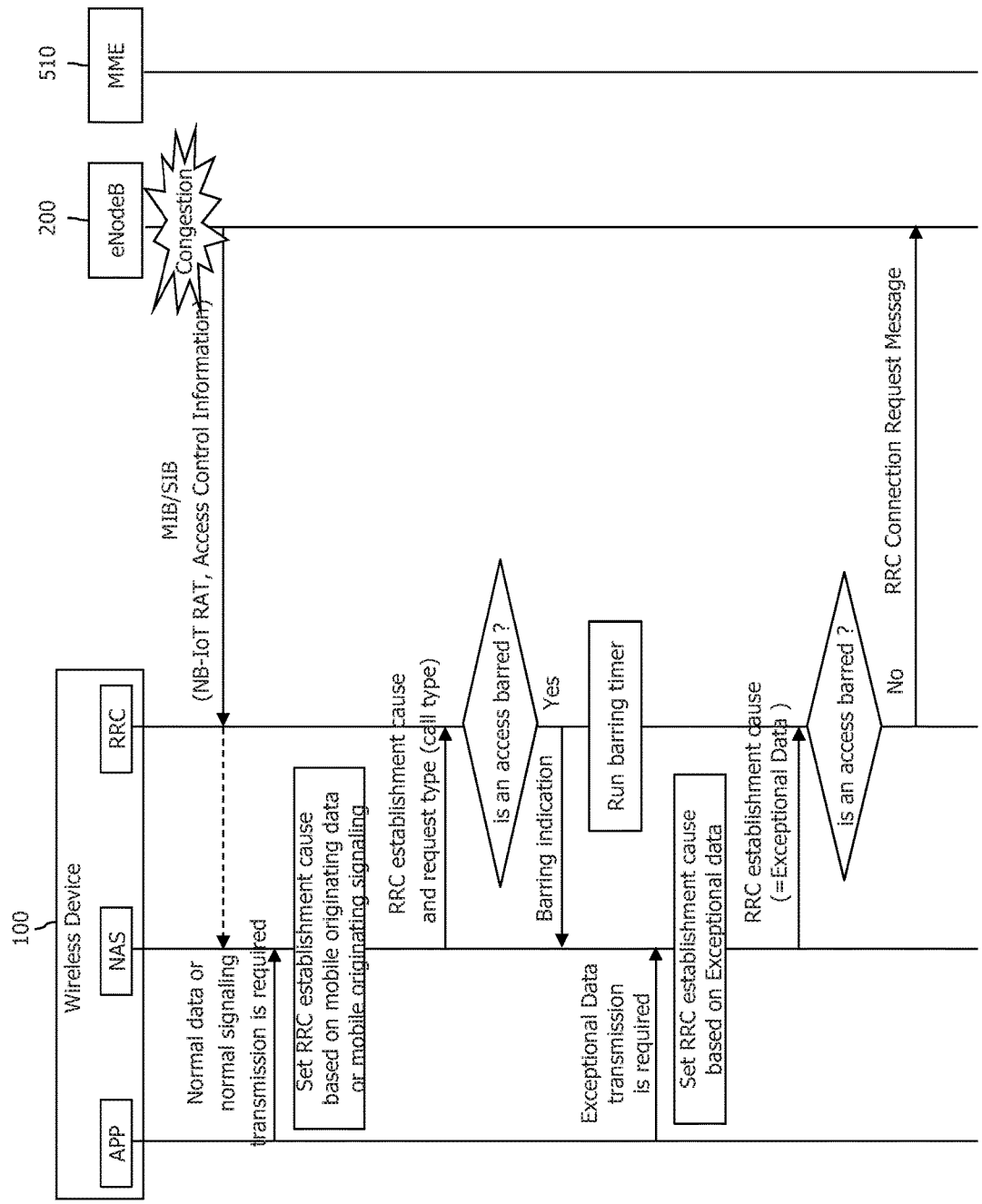
FIG. 12 is a signal flowchart illustrating Method 1 of Proposal 1 schematically.

FIG. 12 is a signal flowchart illustrating Method 1 of Proposal 1 schematically.

First, a base station (e.g., eNodeB) 200 of a network transmits indication/information informing RAC (e.g., NB-IoT support RAT) that supports the CIoT service and access control information to a wireless device (e.g., CIoT device) 100 through MIB or SIB.

The access control information may include one or more of indication/information indicating to apply the access control for the CIoT, parameter information in relation to the access control (e.g., Access control parameters for CIoT), and indication for passing/skipping the barring check of the access control for the CIoT with respect to exceptional data (or exceptional signaling or exceptional voice call).

The AS layer (i.e., RRC layer) of the wireless device (e.g., CIoT device) 100 forwards the information received from the base station to the NAS layer.

Meanwhile, the Application layer of the wireless device 100 informs that a transmission of normal data or normal signaling is required to the NAS layer.

Then, the NAS layer determines an RRC establishment cause of an RRC connection request message for the normal data or the normal signaling and a call type. At this time, the RRC establishment cause is set by being determined by MO data or MO signaling.

The NAS layer forwards NAS signaling request message, the RRC establishment cause and the request type to the AS layer (i.e., RRC layer).

The AS layer (i.e., RRC layer) identifies that the NAS signaling request is a transmission of normal data or normal signaling based on the RRC establishment cause, and performs barring check of the access control based on the indication/information indicating to apply the access control for the CIoT provided from the base station 100 and the parameter information in relation to the access control (e.g., Access control parameters for CIoT). As a result of performing the barring check, in the case that an access to a network or a cell is barred, the AS layer (i.e., RRC layer) does not transmit an RRC connection establishment request message to the base station. In addition, the AS layer (i.e., RRC layer) forwards an indication indicating that the access is barred to the NAS layer. Further, the AS layer (i.e., RRC layer) drives a Barring timer. When the Barring timer expires, the AS layer informs by providing indication/information informing access barring alleviation to the NAS layer.

The NAS layer does not restart the NAS signaling request procedure for transmitting normal data until the Barring timer expires or receiving the indication/information informing access barring alleviation according to the expiration of the Barring timer.

However, even before the Barring timer expires or even before receiving the indication/information informing access barring alleviation according to the expiration of the Barring timer, in the case that a transmission of exceptional data is required, the NAS layer initiates the NAS signaling request procedure and determines the RRC establishment cause of the RRC connection establishment request and the call type. At this time, the RRC establishment cause is set by being determined to exceptional data. The NAS layer forwards the NAS signaling request message, the RRC establishment cause and the call type to the AS layer (i.e., RRC layer).

Then, the AS layer (i.e., RRC layer) identifies that the NAS signaling request is for the transmission of exceptional data based on the RRC establishment cause, and skips the barring check of the access control but does not perform it based on the indication/information indicating to apply the access control for the CIoT and the indication for passing/skipping the barring check of the access control for the CIoT with respect to exceptional data (or exceptional signaling or exceptional voice call). Accordingly, the AS layer (i.e., RRC layer) transmits the RRC connection request message.

I-2. Method 2 of Proposal 1

When the NAS layer starts the NAS signaling request procedure for data transmission, the NAS layer provides a call type and an RRC establishment cause or the indicator to apply the access control for the CIoT (e.g., Access control for CIoT Indicator) to the AS layer (i.e., RRC layer). At this time, the NAS layer may record/mark that the previous NAS signaling request procedure for a normal data transmission is barred. Later, after the NAS layer is provided with indication/information indicating that the access is barred (access barred indication/information) from the AS layer (i.e., RRC layer), when the NAS layer is provided with exceptional data from an Application layer, even in the case that the current access is barred, the NAS layer may start a NAS signaling request procedure for transmitting the exceptional data. At this time, the NAS layer may provide the information informing the transmission of the exceptional data, for example, a call type, an RRC establishment cause or indication/information to apply an exception for an access control for CIoT to the AS layer (i.e., RRC layer). Even in the case that the current access is barred, the AS layer (i.e., RRC layer) identifies that the NAS signaling request procedure is required for transmitting the exceptional data based on the indication/information received from the NAS layer, and performs the barring check of the access control for CIoT for the exceptional data. That is, the Access barring owing to normal data may be overridden owing to the exceptional data.

In other words, in the case that an access is currently barred, with respect to the NAS signaling request procedure for a normal data transmission, the NAS layer does not start the NAS signaling request procedure until the NAS layer receives the indication/information informing the access barring alleviation from the NAS layer, but may start the NAS signaling request procedure immediately for an exceptional data transmission. In addition, in the case that a back-off timer (e.g., T3346, which is a back-off timer for mobility management or T3396, which is a back-off timer for session management) is currently operating, the NAS layer does not start the NAS signaling request procedure until the back-off timer stops or expires with respect to the NAS signaling request for a normal data transmission, but may start the NAS signaling request procedure immediately for an exceptional data transmission. At this time, the NAS layer may disregard the operating back-off timer. Here, the CIoT timer configures the back-off timer as Nas signaling low priority, and the back-off timer is driven when receiving a rejection message including a value of the back-off timer from a network previously. One or a plurality of the back-off timers for session management (i.e., T3396) may be driven for each APN, and may also be driven without APN. At this time, even in the case that the back-off timers for session management (i.e., T3396) is driven without APN, the NAS layer may start the NAS signaling request procedure immediately for an exceptional data transmission. That is, the NAS layer may disregard the back-off timers for session management which is driven without APN (i.e., T3396 with no APN).

Meanwhile, in the case that a CIoT device (or UE) is configured with NAS signaling low priority indicator and/or Override NAS signalling low priority indicator and/or indication/information indicating an exceptional mobile originating for exceptional data (or voice call or signaling), even in the case that a back-off timer is currently operating, the CIoT device (or UE) may disregard the back-off timer, and start NAS signaling request procedure immediately for transmitting an exceptional data (or voice call or signaling).

Hereinafter, with reference to accompanying drawing, Method 2 of Proposal 1 is described in summary.

Figure 13:
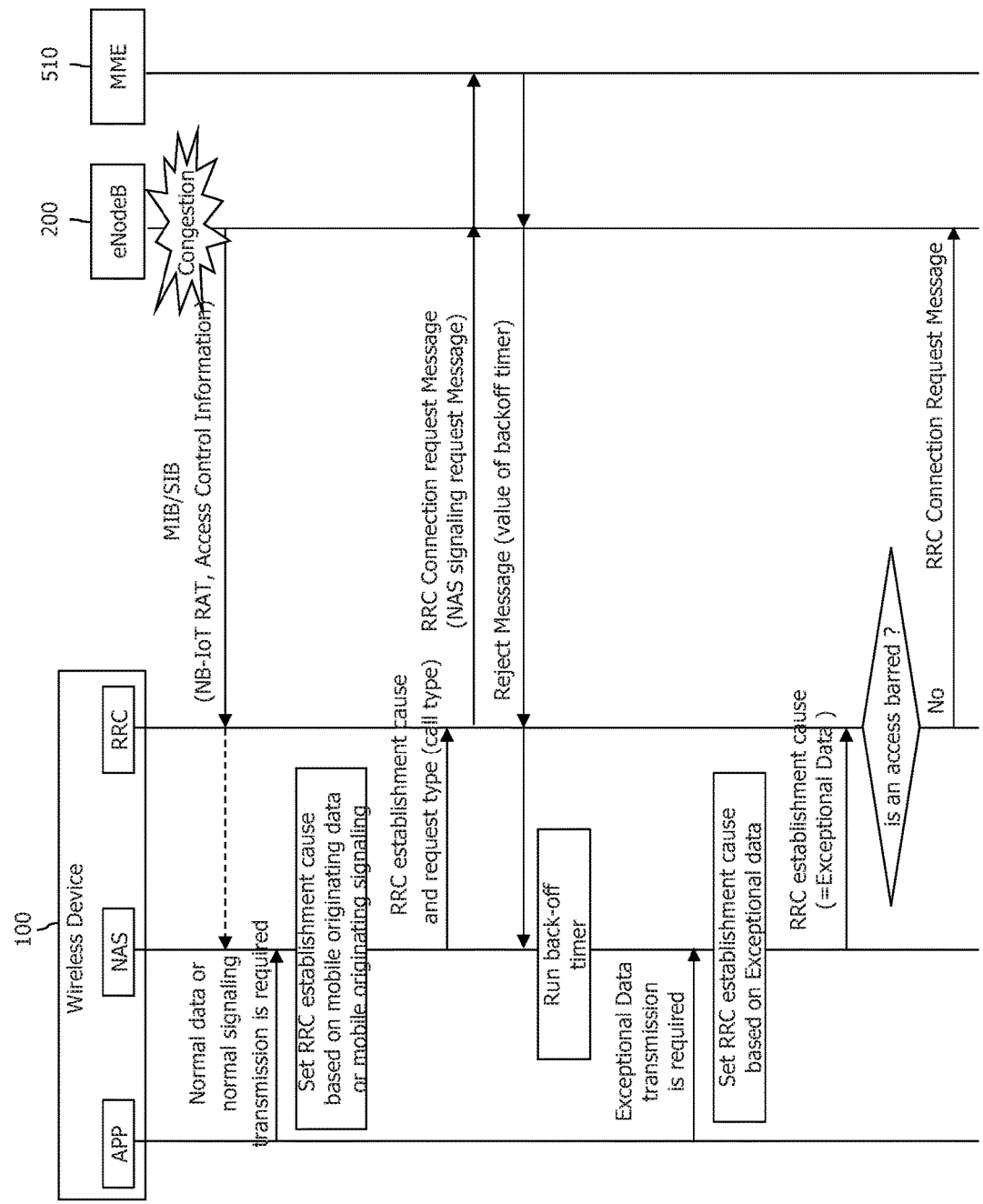
FIG. 13 is a signal flowchart illustrating Method 2 of Proposal 1 schematically.

FIG. 13 is a signal flowchart illustrating Method 2 of Proposal 1 schematically.

First, a base station (e.g., eNodeB) 200 of a network transmits indication/information informing RAC (e.g., NB-IoT support RAT) that supports the CIoT service and access control information to a wireless device (e.g., CIoT device) 100 through MIB or SIB.

The access control information may include one or more of indication/information indicating to apply the access control for the CIoT, parameter information in relation to the access control (e.g., Access control parameters for CIoT), and indication for passing/skipping the barring check of the access control for the CIoT with respect to exceptional data (or exceptional signaling or exceptional voice call).

The AS layer (i.e., RRC layer) of the wireless device (e.g., CIoT device) 100 forwards the information received from the base station to the NAS layer.

Meanwhile, the Application layer of the wireless device 100 informs that a transmission of normal data or normal signaling is required to the NAS layer.

Then, the NAS layer determines an RRC establishment cause of an RRC connection request message for the normal data or the normal signaling and a call type. At this time, the RRC establishment cause is set by being determined by MO data or MO signaling.

The NAS layer forwards NAS signaling request message, the RRC establishment cause and the request type to the AS layer (i.e., RRC layer).

The AS layer (i.e., RRC layer) identifies that the NAS signaling request is a transmission of normal data or normal signaling based on the RRC establishment cause, and performs barring check of the access control based on the indication/information indicating to apply the access control for the CIoT provided from the base station 100 and the parameter information in relation to the access control (e.g., Access control parameters for CIoT). As a result of performing the barring check, in the case that an access to a network or a cell is not barred, the AS layer (i.e., RRC layer) transmits an RRC connection establishment request message to the base station, and transmits the NAS signaling request message to an MME 510.

However, the MME 510 forwards a rejection message including the back-off timer to the wireless device 100. The NAS layer of the wireless device 100 does not restart the NAS signaling request procedure for transmitting normal data until the back-off timer expires.

However, even before the Barring timer expires, in the case that a transmission of exceptional data is required, the NAS layer initiates the NAS signaling request procedure and determines the RRC establishment cause of the RRC connection establishment request and the call type. At this time, the RRC establishment cause is set by being determined to exceptional data. The NAS layer forwards the NAS signaling request message, the RRC establishment cause and the call type to the AS layer (i.e., RRC layer).

Then, the AS layer (i.e., RRC layer) identifies that the NAS signaling request is for the transmission of exceptional data based on the RRC establishment cause, and skips the barring check of the access control but does not perform it based on the indication/information indicating to apply the access control for the CIoT and the indication for passing/skipping the barring check of the access control for the CIoT with respect to exceptional data (or exceptional signaling or exceptional voice call). Accordingly, the AS layer transmits the RRC connection request message.

I-3. Method 3 of Proposal 1

When the NAS layer starts the NAS signaling request procedure for data transmission, the NAS layer provides information such as a call type and an RRC establishment cause or the indication to apply the access control for the CIoT to the AS layer (i.e., RRC layer).

As a result of performing the barring check of the access control by the AS layer (i.e., RRC layer), in the case that the access (e.g., access to a network or a cell) is barred, the AS layer (i.e., RRC layer) forwards the indication/information indicating that the access is barred (access barred indication/information) to the NAS layer. Then, the NAS layer records/marks whether the bar is for transmitting normal data or exceptional data. The record/marking may be performed based on a call type, an RRC establishment cause or indication/information indicating whether an access control for CIoT is for exceptional data or normal data. When the Barring timer (Tbarring) expires, the AS layer (i.e., RRC layer) informs by providing the indication/information informing the access barring alleviation to the NAS layer.

Later, when the NAS layer is provided with exceptional data from an Application layer, even in the case that the current access is barred, the NAS layer may start a NAS signaling request procedure for transmitting the exceptional data regardless of being provided with indication/information indicating that the access is barred (access barred indication/information) from the AS layer (i.e., RRC layer).

At this time, the NAS layer may provide the information informing the transmission of the exceptional data, for example, indication/information to apply an exception for a call type, an RRC establishment cause or an access control for CIoT to the AS layer (i.e., RRC layer). Even in the case that the current access is barred, the AS layer (i.e., RRC layer) identifies that the NAS signaling request procedure is required for transmitting the exceptional data based on the indication/information received from the NAS layer, and performs the barring check of the access control for CIoT for the exceptional data. That is, the Access barring owing to normal data may be overridden owing to the exceptional data.

In the case that the AS layer receives a NAS signaling request from the NAS layer, the AS layer checks whether the NAS signaling request is for a normal data transmission or an exceptional data transmission. The AS layer records/marks that the NAS signaling request for the normal data transmission has been barred previously. Accordingly, the AS layer performs the barring check of the access control for CIoT only in the case that the NAS signaling request is for the exceptional data transmission. As such, in the case that the NAS signaling request from the NAS layer is for the exceptional data transmission, even in the case that a back-off timer (e.g., T3346, which is a back-off timer for mobility management or T3396, which is a back-off timer for session management) is currently operating, the AS layer may perform the barring check of the access control for CIoT for the exceptional data transmission. However, in the case that the NAS signaling request from the NAS layer is for the normal data transmission and a back-off timer (e.g., T3346, which is a back-off timer for mobility management or T3396, which is a back-off timer for session management) is currently operating, since the AS layer records/marks that the NAS signaling request for the normal data transmission has been barred previously, the AS layer disregards the NAS signaling request.

Meanwhile, in the case that a CIoT device (or UE) is configured with NAS signaling low priority indicator and/or Override NAS signalling low priority indicator and/or indication/information indicating an exceptional mobile originating for exceptional data (or voice call or signaling), even in the case that a back-off timer is currently operating, the CIoT device (or UE) may disregard the back-off timer, and start NAS signaling request procedure immediately for transmitting an exceptional data (or voice call or signaling).

In the description above, the AS layer (e.g., RRC layer) may forward the indication/information indicating that the access is barred and the indication/information informing the access barring alleviation to the NAS layer by distinguishing with respect to mobile originating data (or mobile originating voice call), with respect to mobile originating signaling (e.g., Attach request, TAU/RAU request, service request, extended service request, and data service request) and with respect to mobile originating exceptional data (or mobile originating exceptional voice call). Accordingly, a barring timer may also be separately driven with respect to the barring timer for mobile originating data, the barring timer for mobile originating signaling and the barring timer for mobile originating exceptional data.

II. Proposal 2

When an Application layer (or including IMS layer) of a CIoT device requests a call or a data transmission for mobile originating (MO) service to a NAS layer, the NAS layer of the CIoT device may setup a call type and an RRC establishment cause field for the MO service as below.

1) With respect to signaling such as Attach request message, Tracking Area Update (TAU)/Routing Area Update (RAU) request message, service request message, extended service request message, and data service request message, the CIoT device may Setup the call type as (Mobile) originating signalling, "originating MMTEL voice for MMTEL voice", "originating MMTEL video for MMTEL video", "originating SMSoIP for SMS over IP", or "originating SMS for SMS over NAS". And, Setup the RRC establishment cause field as MO signalling.

2) With respect to (normal) call or data, the CIoT device may

Setup the call type as (Mobile) originating calls, "originating MMTEL voice for MMTEL voice", "originating MMTEL video for MMTEL video", "originating SMSoIP for SMS over IP", or "originating SMS for SMS". And, Setup the RRC establishment cause field as MO data.

3) With respect to Mobile Terminate (MT) service, the CIoT device may

Setup the call type as (Mobile) terminating calls. And

Setup the RRC establishment cause field as MT access.

4) With respect to call, data or signaling for (urgent data, exceptional data), the CIoT device Setup the call type as call type: (Mobile) originating exception (or MO exception calls) or (Mobile) originating calls or (Mobile) originating signalling. And Setup the RRC establishment cause field as MO exception (or MO exception data, MO exception signalling, etc.).

Alternatively, not using such a call type, instead of using the call type as the same as previously, while starting the NAS signaling request procedure, the NAS layer may provide an indication having a meaning of applying the access control for CIoT to the AS layer (i.e., RRC layer).

Then, when the AS layer (i.e., RRC layer) identifies the RAT for a CIoT service or a CIoT service through the information provided through SIB or MIB from the network or the information/indication separately provided from the NAS layer, the AS layer (i.e., RRC layer) may substitute/change the RRC establishment cause field received from the NAS layer to MO exception, and then, perform the barring check for access control.

Meanwhile, when a network supports a CIoT service, the network may inform the information indicating the RAT that supports the CIoT service to a CIoT device (or UE) through SIB or MIB. When the CIoT device (or UE) of the AS layer (i.e., RRC layer) receives the information, the CIoT device (or UE) may forward it to the NAS layer. The description above may be applied to the case that the CIoT device operates when receiving the information or operates regardless of the reception of the information.

III. Proposal 3

Meanwhile, in the case that a CIoT device moves to a normal LTE network (i.e., moves to a normal LTE network in which a transmission of mobile originating exceptional data is not supported/identified), when starting the NAS signaling request procedure for a data transmission, a NAS layer of the CIoT device forwards the information such as a call type and an RRC establishment cause or an indication indicating to apply an access control for CIoT (e.g., Access control for CIoT) to an AS layer (e.g., RRC layer).

Then, when the AS layer obtains information such as ACB, EAB, SSAC, ACDC, and the like from a base station of the normal LTE network through SIB, the AS layer should perform the respective access control.

However, since the CIoT device supports a CIoT service, an efficient processing method is required for transmitting urgent exceptional data that is not supported/identified in the normal LTE network.

The CIoT device should be able to an RRC connection establishment or an RRC connection restart for mobile originating exceptional data (or exceptional voice call or exceptional signaling), different from other normal data (or normal signaling).

For this, for transmitting the mobile originating exceptional data, the NAS layer of the CIoT device may provide indication/information indicating to skip/pass the barring check of ACB, the barring check of EAB and the barring check of ACDC to the AS layer (e.g., RRC layer). The indication/information indicating to skip/pass the barring check may be provided to each of the ACB/EAB/ACDC, respectively, or provided at one time. Then, even in the case that the AS layer (e.g., RRC layer) receives the information for ACB/EAB/ACDC from the base station of the network through SIB, the AS layer (e.g., RRC layer) may skip all of the barring check of ACB/EAB/ACDC for the mobile originating exceptional data based on the indication/information provided from the NAS layer. Here, skipping of the barring check of EAB may performed only in the case that the CIoT device is not configured as NAS signaling low-priority or configured to disregard EAB.

Or, the NAS layer of the CIoT device may provide indication/information indicating to skip/pass the barring check of ACB/EAB/ACDC, a call type and an RRC establishment cause to the AS layer. Then, even in the case that the AS layer (e.g., RRC layer) receives the information for ACB/EAB/ACDC from the base station of the network through SIB, the AS layer (e.g., RRC layer) may skip all of the barring check of ACB/EAB/ACDC for the mobile originating exceptional data based on the indication/information, the call type and the RRC establishment cause provided from the NAS layer.

Alternatively, instead of providing indication/information indicating to skip/pass the barring check of ACB/EAB/ACDC, the NAS layer of the CIoT device may provide only the call type and the RRC establishment cause to the AS layer. Then, based on the call type and the RRC establishment provided from the NAS layer, the AS layer may skip all of the barring check of ACB/EAB/ACDC for the mobile originating exceptional data.

The operation that the AS layer of the CIoT device skips the barring check of ACB/EAB/ACDC may performed only in the case that the Overriding NAS signalling low priority indicator or the indicator/information indicating mobile originating exceptional data is setup for the CIoT device.

Meanwhile, in the case that the NAS signalling low priority indicator and EAB are setup to the CIoT device, in the case that the indicator/information indicating mobile originating exceptional data is setup, and in the case that an Application layer indicates to apply EAB to the NAS layer, the NAS layer may indicate to apply EAB for the NAS signaling request to the AS layer (e.g., RRC layer). However, in the case that the Application layer forwards the indication to apply the access control for CIoT (e.g., Access control for CIoT) to the NAS layer, the NAS layer may indicate to apply the access control for CIoT with respect to the NAS signaling request to the AS layer (e.g., RRC layer). Otherwise, regardless of forwarding the indication to apply the access control for EAB information or CIoT in the Application layer, according to the indication to apply the access control for EAB information or CIoT provided from the network, the NAS layer may indicate to apply the access control for the corresponding EAB or CIoT to the AS layer (e.g., RRC layer). Then, the AS layer may perform the barring check of the access control for EAB or CIoT based on the EAB information provided from the network, the parameter related to the access control for CIoT and the indication provided from the NAS. In the case that the indication provided from the NAS (e.g., the barring check of EAB access control), the indication to apply the barring check of the access control for CIoT, the EAB information provided from the network and the parameter related to the access control for CIoT are different, based on the parameter provided from the network, the AS layer may perform the barring check of EAB access control and/or the barring check of the access control for CIoT, or may not perform both of them. At this time, the CIoT device may be configured as NAS signaling low-priority and/or EAB.

Otherwise, regardless of forwarding the indication to apply the access control for EAB information or CIoT in the Application layer, according to the indication and the configuration to apply the access control for EAB information or CIoT provided from the network, the NAS layer may indicate to apply the access control for the corresponding EAB or CIoT to the AS layer (e.g., RRC layer). Then, regardless of the indication provided from the NAS layer, based on the EAB information provided from the network or the indication indicating to apply the access control for CIoT, the AS layer (e.g., RRC layer) may perform the barring check of the EAB access control and/or the barring check of the access control for CIoT, or may not perform both of them. At this time, the CIoT device may be configured as NAS signaling low-priority and/or EAB.

In the case that the Application layer indicates to apply both of the access control for EAB and the access control for CIoT to the NAS layer, the NAS layer may indicate to apply both of the access control for EAB and the access control for CIoT to the AS layer (e.g., RRC layer) with respect to the NAS signaling request. Then, based on the parameter related to the access control for EAB information and CIoT provided from the network, and the indication provided from the NAS layer, the AS layer (e.g., RRC layer) may perform both of the barring check of the EAB access control and/or the barring check of the access control for CIoT. In the case that the indication provided from the NAS (e.g., the barring check of EAB access control), the indication to apply the barring check of the access control for CIoT, the EAB information provided from the network and the parameter related to the access control for CIoT are different, based on the parameter provided from the network, the AS layer may perform the barring check of EAB access control and/or the barring check of the access control for CIoT, or may not perform both of them. At this time, the CIoT device may be configured as NAS signaling low-priority and/or EAB.

The proposals described above may be used in combination.

The contents described so far may be implemented by hardware. This is described by referring to accompanying drawing.

FIG. 14 is a block diagram illustrating a configuration of a wireless device 100 and a base station 200 according to an embodiment of the present invention.

As shown in FIG. 14, the wireless device 100 includes a storage means 101, a controller 102 and a transceiver unit 103. And the base station 200 includes a storage means 201, a controller 202 and a transceiver unit 203.

The storage means 101 and 201 store the method described above.

The controllers 102 and 202 control the storage means 101 and 201 and the transceiver units 103 and 203. Particularly, the controllers 102 and 202 perform the methods stored in the storage means 101 and 201. And the controllers 102 and 202 transmit the signals described above through the transceiver units 103 and 203.

So far, the preferred embodiments of the present invention are described as an example, but the scope of the present invention is not limited to a specific embodiment. Accordingly, the present invention may be modified, changed or improved in various forms within the scope written in the inventive concept and the claims.

What is claimed is:

1. A method for trying a network access, the method performed by a wireless device and comprising:
   receiving first information related to a narrowband internet of things (NB-IoT) radio access technology (RAT) from a cell;
   starting a back-off timer based on a previous reception of a reject message, wherein a non-access stratum (NAS) signaling procedure is not started until the back-off timer expires unless an abnormal case occurs;
   wherein the abnormal case comprises wherein where the wireless devices uses the NB-IoT RAT and wherein the NAS signaling procedure is for transmitting an exceptional data, in which case the NAS signaling procedure is started while the back-off timer is running; and
   setting a radio resource control (RRC) establishment cause of RRC connection request message to Mobile Originating (MO) exception data based on that the started NAS signaling procedure is for transmitting the exceptional data.

2. The method of claim 1, wherein the first information related to the NB-IoT RAT is received via a master information block (MIB) or a system information block (SIB).

3. The method of claim 1, further comprising:
   receiving, from the cell, second information related to whether an access barring is applied or not for the exceptional data.

4. The method of claim 3, wherein the second information is received via a system information block (SIB).

5. The method of claim 3, further comprising:
   performing an access barring check,
   wherein a network access for transmitting the exceptional data is considered as not barred by the performed access barring check based on that the RRC establishment cause is set to the MO exception data and based on that the access barring is not applied for the exceptional data.

6. The method of claim 2, wherein the MIB further includes:
   third information related to whether the access barring is enabled or not.

7. The method of claim 4, wherein the SIB further includes
   a bitmap related to whether the access baring is on or off.

8. A method for trying a network access, the method performed by a wireless device and comprising:
   receiving, from a cell, first information related to a narrowband internet of things (NB-IoT) radio access technology (RAT);
   starting a NAS signaling procedure while an access to the cell is currently barred based on that the NAS signaling procedure is for transmitting an exceptional data and based on that the wireless device uses the NB-IoT RAT; and setting a RRC establishment cause of RRC connection request message to Mobile Originating (MO) exception data based on that the started NAS signaling procedure is for transmitting the exceptional data.

9. A wireless device for trying a network access, the wireless device comprising:
a transceiver; and
a processor configured to control the transceiver to:
receive first information related to a narrowband internet of things (NB-IoT) radio access technology (RAT) from a cell;
start a back-off timer based on a previous reception of a reject message, wherein a non-access stratum (NAS) signaling procedure is not started until the back-off timer expires unless an abnormal case occurs;
wherein the abnormal case comprises wherein the wireless devices uses the NB-IoT RAT and wherein the NAS signaling procedure is for transmitting an exceptional data, in which case the NAS signaling procedure is started while the back-off timer is running; and
set a RRC establishment cause of RRC connection request message to Mobile Originating (MO) exception data based on that the started NAS signaling procedure is for transmitting the exceptional data.

10. The wireless device of claim 9, wherein the first information related to the NB-IoT RAT is received via a master information block (MIB) or a system information block (SIB).

11. The wireless device of claim 9, wherein the processor is further configured to controls the transceiver to receive, from the cell, second information related to whether an access barring is applied or not for the exceptional data.

12. The wireless device of claim 11, wherein the second information is received via a system information block (SIB).

13. The wireless device of claim 11, wherein the processor is further configured to perform an access barring check,
wherein a network access for transmitting the exceptional data is considered as not barred by the performed access barring check based on that the RRC establishment cause is set to the MO exception data and based on that the access barring is not applied for the exceptional data.

14. The wireless device of claim 10, wherein the MIB further includes:
third information related to whether the access barring is enabled or not.

15. The wireless device of claim 12, wherein the SIB further includes
a bitmap related to whether the access baring is on or off.

* * * * *